Dec. 20, 1949     O. L. QUILLEN     2,491,764
MECHANICAL POWER TRANSMISSION DEVICE
Filed May 20, 1948     2 Sheets-Sheet 1

O. L. Quillen
INVENTOR
ATTORNEYS.

Dec. 20, 1949  O. L. QUILLEN  2,491,764
MECHANICAL POWER TRANSMISSION DEVICE
Filed May 20, 1948  2 Sheets-Sheet 2

O. L. Quillen
INVENTOR
BY *Snow & Co.*
ATTORNEYS.

Patented Dec. 20, 1949

2,491,764

UNITED STATES PATENT OFFICE 2,491,764

MECHANICAL POWER TRANSMISSION DEVICE

Orville L. Quillen, Hastings on Hudson, N. Y.

Application May 20, 1948, Serial No. 28,203

1 Claim. (Cl. 74—243)

This invention relates to a power transmission device, and more particularly to a power transmission device primarily designed for use in powering mechanisms such as dental drills or the like instruments operated by dental engines, wherein flexibility, noiselessness and vibrationlessness are essential to the prosecution of dental work.

An important object of the invention is to provide a device of this character wherein meshing gears mounted on cooperating shafts, which structure is necessarily noisy and objectionable, are eliminated, insuring an efficient transmission device.

Still another object of the invention is to provide a transmission device wherein the lubricating material may be sealed in the casing, insuring adequate lubrication for the moving parts of the transmission thereby appreciably increasing the life of the transmission mechanism.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
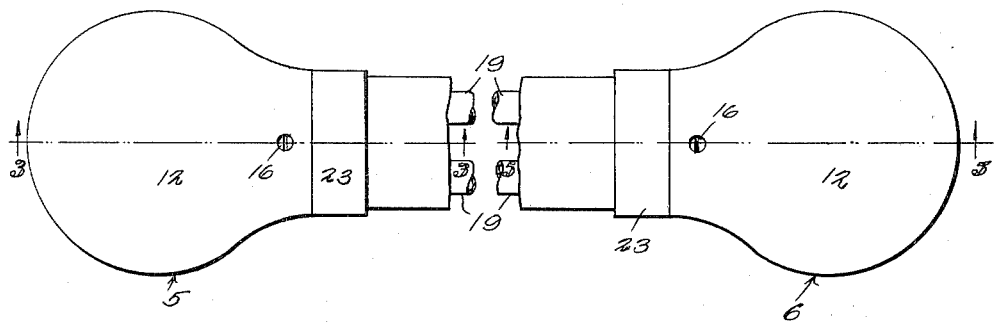
Figure 1 is a plan view of a transmission mechanism, constructed in accordance with the invention.
Figure 2:
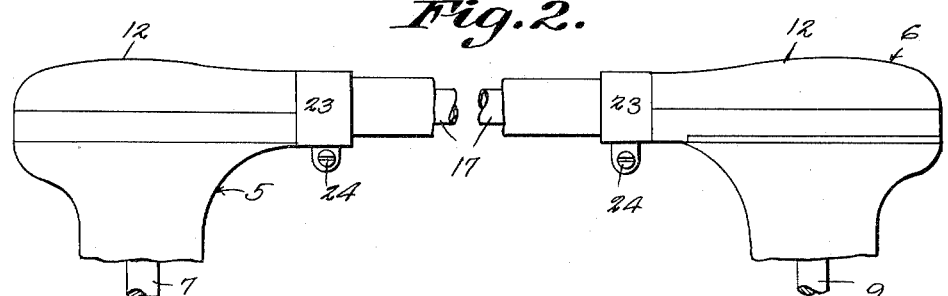
Fig. 2 is a side elevational view thereof.
Figure 3:
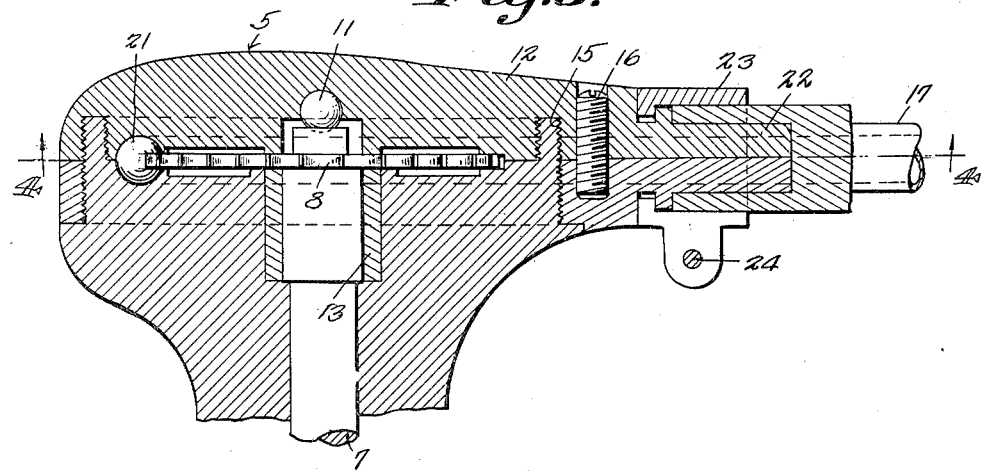
Fig. 3 is a sectional view taken on line 3—3 of Fig. 1.
Figure 4:
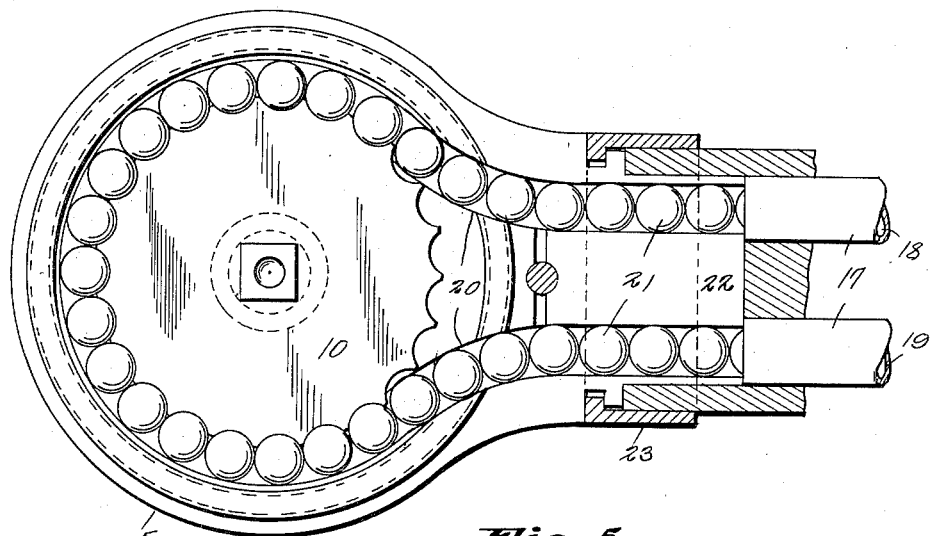
Fig. 4 is a sectional view taken on line 4—4 of Fig. 3.
Figure 5:
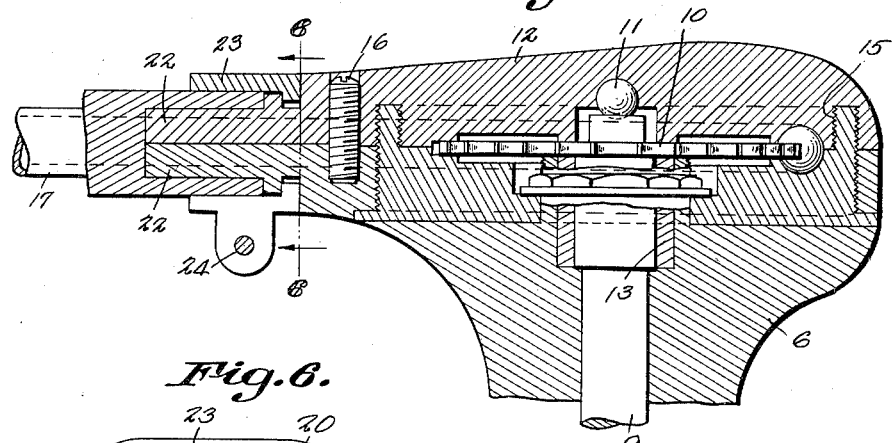
Fig. 5 is an enlarged vertical sectional view through one end of the casing taken on line 5—5 of Fig. 1.
Figure 6:
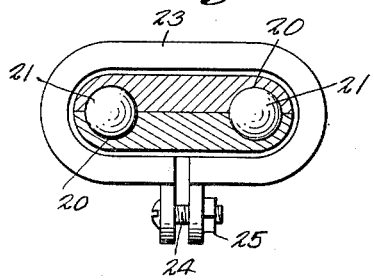
Fig. 6 is a sectional view taken on line 6—6 of Fig. 5.

Referring to the drawings in detail, the transmission mechanism embodies the housings 5 and 6, the housing 5 being supported at the upper end of the drive shaft 7 on the upper end of which is secured the sprocket 8. The housing 6 is mounted at the upper end of the driven shaft 9 in which the sprocket 10 is secured, the sprocket 10 being mounted on the upper end of the driven shaft 9.

Thrust bearings of the ball type indicated at 11 are mounted within the removable upper sections 12 of the housings 5 and 6, against which the shafts extending into the housings, engage, holding the shafts against vibration. Bearings indicated at 13 are provided on shafts 7 and 9 so that the housings mounted on the upper ends of the shafts, will be held against movement with respect to the shafts.

As clearly shown by the drawings, the upper sections 12 are secured by the threads 15, to the lower sections of the housings so that the sections may be readily and easily disconnected when it is desired to repair or recondition the mechanism. Set screws 16 are positioned in registering openings of the housings, holding the sections of the housings together under normal conditions.

Connecting the housings 5 and 6, is the tubular runway 17 which tubular runway is provided with circular passageways 18 and 19, which passageways communicate with the short passageways 20 providing continuous passageways between the housings, for the reception of the balls 21 which completely fill the passageways and recesses formed between the teeth of the sprocket wheels 10. The tubular runway has its ends secured to the extensions 22 of the housings, by means of the split bands 23 that grip the ends of the tubular runway, the split bands being secured by means of the bolts 24 supplied with nuts 25.

It will of course be understood that the driven shaft is connected with the mechanism operated by the power transmission device, in any suitable and well known manner, preferably by the well known flexible shafting not shown.

In operation, it will be obvious that as the power shaft is rotated, the sprocket at the upper end thereof will be rotated, causing the balls to be fed through the passageways forcing them into the recesses between the teeth of the sprocket on the driven shaft to the end that the driven shaft is rotated for the purpose for which it has been designed.

Due to the construction shown and described, it will be obvious that I have provided a power transmission which is especially adapted for use with dental instruments, wherein it is essential that noise and vibrations be reduced to the minimum. It will also be noted that the structure embodies an exceptionally flexible transmission.

Having thus described the invention, what is claimed is:

A power transmission device comprising a drive shaft and a driven shaft, a housing mounted on one end of each shaft, a sprocket secured to each shaft, the sprockets being sealed within the housings, said housings embodying separable sections, thrust bearings within the housings against which the shafts engage, a tubular runway having dual passageways, connecting the housings, the dual passageways being in communication with the housings, balls filling the passageways and spaces between the teeth of the sprockets whereby rotation of the sprocket on the drive shaft forces the balls through the passageways in contact with the sprocket on the driven shaft, rotating the driven shaft as the drive shaft rotates.

ORVILLE L. QUILLEN.

REFERENCES CITED

The following references are of record in the file of this patent:

UNITED STATES PATENTS

| Number | Name | Date |
|---|---|---|
| 576,105 | Flindall | Feb. 2, 1897 |
| 1,446,069 | Root | Feb. 20, 1923 |
| 1,483,114 | Root | Feb. 12, 1924 |